United States Patent
Ikehara et al.

(10) Patent No.: US 11,708,762 B2
(45) Date of Patent: Jul. 25, 2023

(54) FILM COOLING STRUCTURE AND TURBINE BLADE FOR GAS TURBINE ENGINE

(71) Applicant: IHI Corporation, Tokyo (JP)

(72) Inventors: Ryo Ikehara, Tokyo (JP); Shu Fujimoto, Tokyo (JP); Yoji Okita, Tokyo (JP); Seiji Kubo, Tokyo (JP); Hitoshi Hattori, Tokyo (JP)

(73) Assignee: IHI Corporation, Tokyo (JP)

( * ) Notice: Subject to any disclaimer, the term of this patent is extended or adjusted under 35 U.S.C. 154(b) by 87 days.

(21) Appl. No.: 17/451,215

(22) Filed: Oct. 18, 2021

(65) Prior Publication Data
US 2022/0034230 A1 Feb. 3, 2022

Related U.S. Application Data

(63) Continuation of application No. PCT/JP2020/021896, filed on Jun. 3, 2020.

(30) Foreign Application Priority Data

Jun. 7, 2019 (JP) .................................. 2019-107004

(51) Int. Cl.
*F02C 7/18* (2006.01)
*F01D 5/18* (2006.01)

(52) U.S. Cl.
CPC ................. *F01D 5/18* (2013.01); *F02C 7/18* (2013.01); *F05D 2220/32* (2013.01); *F05D 2260/202* (2013.01)

(58) Field of Classification Search
CPC .......... F01D 5/18; F02C 7/18; F05D 2220/32; F05D 2260/202
See application file for complete search history.

(56) References Cited

U.S. PATENT DOCUMENTS 6,307,175 B1 10/2001 Bloechlinger et al.
10,822,958 B2 * 11/2020 Wang ...................... F01D 5/186
(Continued)

FOREIGN PATENT DOCUMENTS

CA 2 282 010 A1 3/2000
GB 2 389 330 A 12/2003
(Continued)

OTHER PUBLICATIONS

Extended European Search Report dated Oct. 25, 2022 in European Patent Application No. 20818228.7, 8 pages.
(Continued)

*Primary Examiner* — Igor Kershteyn
*Assistant Examiner* — Theodore C Ribadeneyra
(74) *Attorney, Agent, or Firm* — Oblon, McClelland, Maier & Neustadt, L.L.P.

(57) ABSTRACT

The film cooling structure includes a wall part and a cooling hole inclined such that an outlet is positioned rearward of an inlet. The cooling hole includes a straight-tube part and a diffuser part. The diffuser part includes a flat surface, a curved surface curved rearward and forming, together with the flat surface, a semicircular or semi-elliptical channel cross section larger than that of the straight-tube part, a first section and a second section extending from the first section toward the outlet. In the first section, an area of the channel cross section increases as it approaches the outlet. In the second section, the area of the channel cross section increases as it approaches the outlet at an increase rate smaller than that of the first section or is constant. The diffuser part has a width equal to or twice greater than the depth of the diffuser part.

20 Claims, 8 Drawing Sheets

(56) References Cited

U.S. PATENT DOCUMENTS

| | | | | |
|---|---|---|---|---|
| 11,085,641 B2* | 8/2021 | Dudebout | ............... | F23R 3/04 |
| 11,585,224 B2* | 2/2023 | Garay | ............... | F01D 9/023 |
| 2005/0286998 A1* | 12/2005 | Lee | ............... | B23K 26/384 |
| | | | | 415/117 |
| 2007/0025852 A1* | 2/2007 | Camhi | ............... | B23K 35/0216 |
| | | | | 416/97 R |
| 2009/0184203 A1* | 7/2009 | Briere | ............... | B23H 9/10 |
| | | | | 219/69.15 |
| 2010/0192588 A1* | 8/2010 | Gerendas | ............... | B23K 26/389 |
| | | | | 60/752 |
| 2010/0239412 A1 | 9/2010 | Draper | | |
| 2012/0051941 A1* | 3/2012 | Bunker | ............... | F01D 5/186 |
| | | | | 416/97 R |
| 2012/0102959 A1* | 5/2012 | Starkweather | ............... | F23R 3/04 |
| | | | | 428/131 |
| 2012/0167389 A1* | 7/2012 | Lacy | ............... | F01D 5/186 |
| | | | | 29/889.1 |
| 2014/0161585 A1* | 6/2014 | Arness | ............... | F01D 5/186 |
| | | | | 415/177 |
| 2014/0271229 A1 | 9/2014 | Nita et al. | | |
| 2016/0061451 A1* | 3/2016 | Dudebout | ............... | F23R 3/04 |
| | | | | 60/755 |
| 2016/0123156 A1 | 5/2016 | Hucker et al. | | |
| 2017/0298743 A1 | 10/2017 | Webster et al. | | |

FOREIGN PATENT DOCUMENTS

| | | |
|---|---|---|
| JP | 2000-064806 A | 2/2000 |
| JP | 2000-087701 A | 3/2000 |
| JP | 2013-124612 A | 6/2013 |
| JP | 5600449 B2 | 10/2014 |
| JP | 2017-198199 A | 11/2017 |

OTHER PUBLICATIONS

International Search Report dated Aug. 25, 2020 in PCT/JP2020/021896 filed on Jun. 3, 2020, 2 pages.

* cited by examiner

FILM COOLING STRUCTURE AND TURBINE BLADE FOR GAS TURBINE ENGINE

CROSS REFERENCE TO RELATED APPLICATIONS

This application is a continuation application of International Application No. PCT/JP2020/021896, now WO2020/246494, filed on Jun. 3, 2020, which claims priority to Japanese Patent Application No. 2019-107004, filed on Jun. 7, 2019, the entire contents of which are incorporated by reference herein.

BACKGROUND

1. Technical Field

The present disclosure relates to a film cooling structure and a turbine blade for a gas turbine engine.

2. Description of the Related Art

A turbine of a gas turbine engine includes turbine blades that constitute stator vanes and turbine blades. The turbine blades are exposed to combustion gas from the combustor. To prevent thermal damage due to the combustion gas, a number of film cooling holes are formed on an airfoil surface of each turbine blade (see Japanese Patent No. 5600449 and Japanese Patent Laid-Open Application Publication No. 2013-124612).

SUMMARY

To improve the efficiency of the gas turbine engine, it is important to increase the temperature of combustion gas (combustion temperature). With the increase of combustion temperature, further improvement is required in the cooling efficiency of the turbine blade.

The present disclosure has been made with the above consideration, is objected to provide a film cooling structure and a turbine blade for a gas turbine engine, which are capable of improving cooling efficiency.

A first aspect of the present disclosure is a film cooling structure including: a wall part having an outer surface and an inner surface and extending forward and rearward; a cooling hole penetrating through the wall part, including an inlet opening to the inner surface and an outlet opening to the outer surface, and being inclined such that the outlet is positioned rearward of the inlet; wherein the cooling hole includes a straight-tube part having the inlet, and a diffuser part connecting with the straight-tube part and having the outlet, the diffuser part includes: a flat surface; a curved surface curved rearward and forming a channel cross section together with the flat surface, the channel cross section having a semicircular or semi-elliptical shape larger than that of the straight-tube part; a first section in which an area of the channel cross section increases as the channel cross section approaches the outlet of the cooling hole; and a second section in which an area of the channel cross section increases at an increase rate or is constant as the channel cross section approaches the outlet of the cooling hole, the second section extending from the first section toward the outlet of the cooling hole, and the increase rate being smaller than that in the first section, the straight-tube part is positioned inside the diffuser part on a projection plane of the cooling hole orthogonal to an extending direction of the cooling hole, and the diffuser part has a length along the flat surface on the projection plane equal to or twice greater than a of the diffuser part along a direction orthogonal to the flat surface on the projection plane.

The diffuser section may include a third section positioned between the straight-tube part and the first section. The third section may extend between the straight-tube part and the first section with a cross section of the same shape as the cross section of the first section at a position closest to the straight-tube part.

The flat surface of the diffuser part may be offset forward of an inner peripheral surface of the straight-tube part on the projection plane.

On the projection plane, the flat surface of the diffuser part may be located forward of a central axis of the straight-tube part by a distance same as a distance from the central axis to a forefront portion of the inner peripheral surface of the straight-tube part, the portion being located forefront.

The curved surface of the diffuser part may include a first recess extending to the outlet of the cooling hole. The first recess may be located on each of both sides of the straight-tube part in a direction along the flat surface of the diffuser part on the projection plane.

The curved surface of the diffuser part may include a second recess extending to the outlet of the cooling hole. The second recess may be located rearmost on the projection plane.

A second aspect of the present disclosure is a turbine blade for a gas turbine engine including the film cooling structure according to the first aspect of the present disclosure.

The present disclosure can provide a film cooling structure and a turbine blade for a gas turbine engine, which are capable of improving cooling efficiency.

BRIEF DESCRIPTION OF THE DRAWINGS

FIG. 8A is a diagram illustrating a first example thereof, and FIG. 8B is a diagram illustrating a second example thereof.

FIG. 9A is a cross-sectional view illustrating a first example thereof, and FIG. 9B is a cross-sectional view illustrating a second example thereof.

DESCRIPTION OF THE EMBODIMENTS

Figure 1:
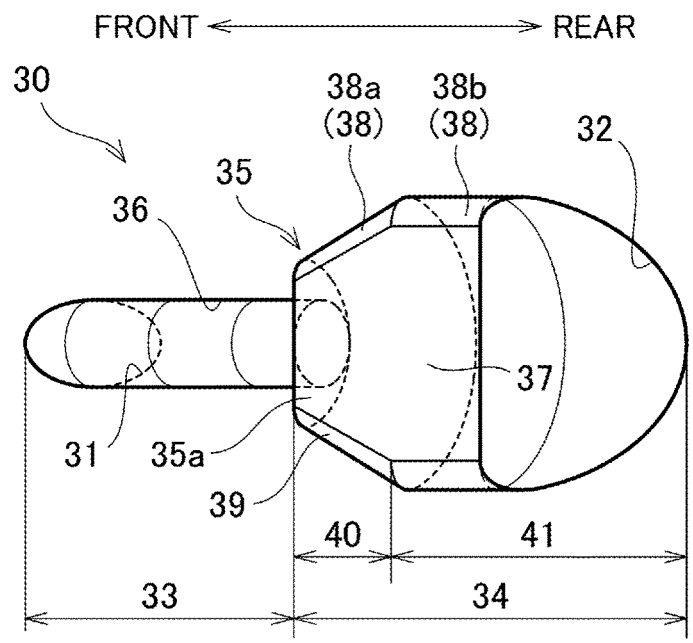
FIG. 1 is a top view illustrating a cooling hole according to a first embodiment of the present disclosure.

Embodiments of the present disclosure will be described with reference to the drawings. Components common in respective drawings are denoted by the same reference numerals, and the description to be duplicated thereof will be omitted.

The film cooling structure according to the present embodiment is provided on a structure exposed to a high-temperature heat medium (for example, combustion gas). The structure may be, for example, a turbine blade (rotor blade and stator vane) of a gas turbine engine (not shown), a combustor liner, a nozzle of a rocket engine, or the like. A large number of cooling holes are formed in a wall part of the structure. The cooling holes constitute a film cooling structure together with the wall part. The cooling medium CG (e.g., air) flowing out of the cooling holes forms a heat insulating layer on the wall part to protect the structure from the heat medium. Hereinafter, for convenience of explanation, the upstream side in the flow direction of the heat medium HG is defined as "forward (front)" and the downstream side in the flow direction of the heat medium HG is defined as "rearward (rear)".

First Embodiment

Figure 2:
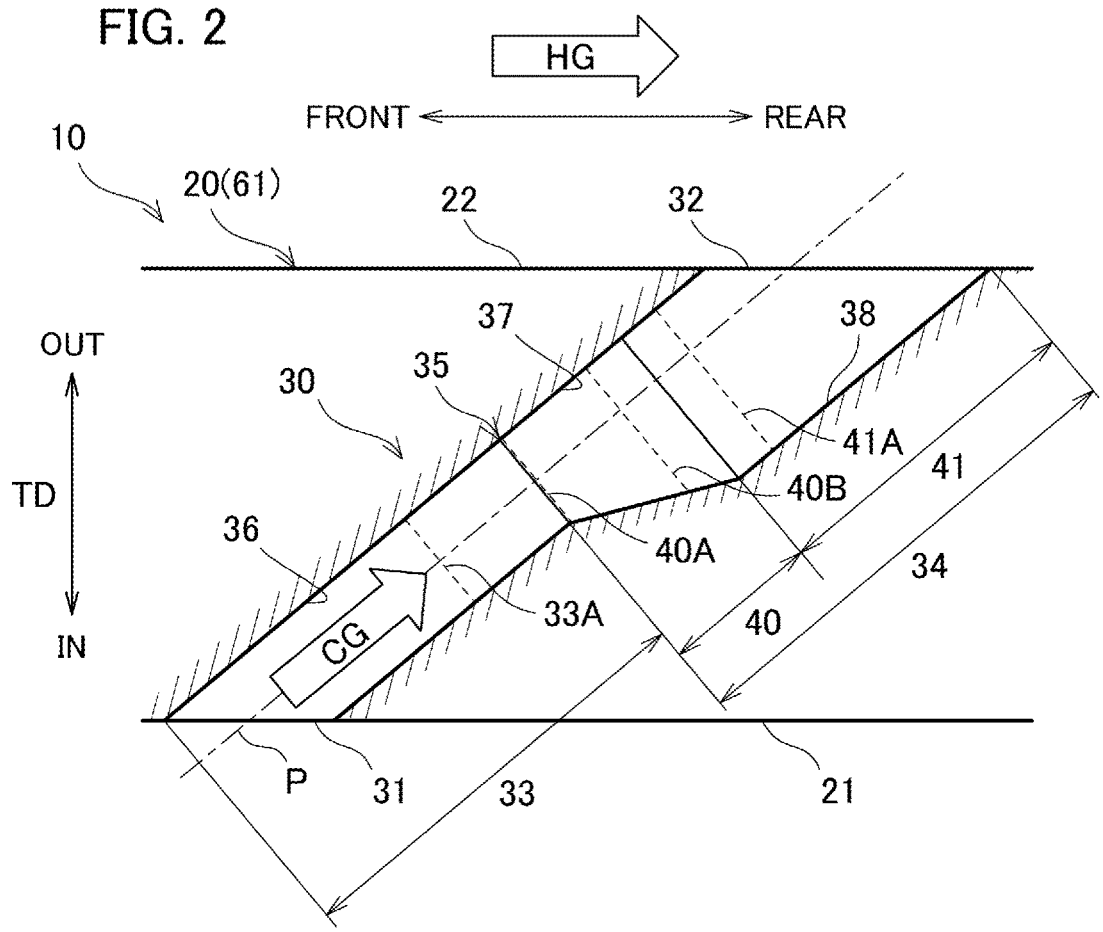
FIG. 2 is a cross-sectional view illustrating a film cooling structure according to a first embodiment.
Figure 3:
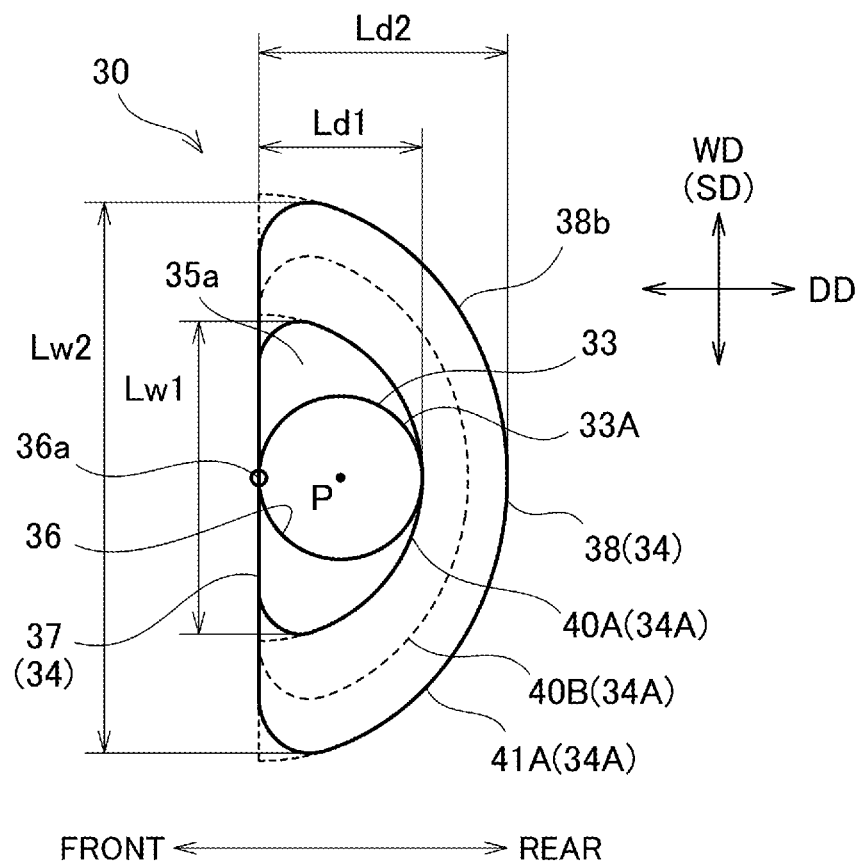
FIG. 3 is a diagram (projection view) illustrating an example of a cooling hole according to a first embodiment on a projection plane.

A first embodiment of the present disclosure will be described. FIG. 1 is a top view illustrating a cooling hole (cooling channel) 30 in a film cooling structure 10 according to the present embodiment. FIG. 2 is a cross-sectional view illustrating the film cooling structure 10 according to the present embodiment. FIG. 3 is a diagram (projection view) illustrating an example of the cooling hole 30 on a projection plane orthogonal to the extending direction of the cooling hole 30. This projection view shows the relative positions of the straight-tube part 33 described later and the diffuser part 34 described later, and respective channel cross sections (in other words, contours). Hereinafter, the "projection plane" is interpreted as a projection plane of the cooling hole 30 orthogonal to an extending direction of the cooling hole 30 (in other words, the central axis P).

As shown in FIG. 2, the film cooling structure 10 includes the wall part 20 and the cooling hole 30. The wall part 20 has an inner surface 21 and an outer surface 22. The wall part 20 extends forward and rearward. The outer surface 22 is exposed to a heating medium HG and the inner surface 21 faces a cooling medium CG. The material of the wall part 20 may be a known heat-resistant alloy.

The cooling hole 30 includes an inlet 31 opening to the inner surface 21 and an outlet 32 opening to the outer surface 22. The cooling hole 30 penetrates through the wall part 20 and is inclined such that the outlet 32 is positioned rearward of the inlet 31. In other words, the cooling holes 30 extend from the inner surface 21 to the outer surface 22 at an angle inclined toward a flow direction of the heat medium HG with respect to a thickness direction TD of the wall part 20. The cooling medium CG flows into the inlet 31 and flows out from the outlet 32.

As shown in FIG. 1, the cooling hole 30 includes a straight-tube part 33 and a diffuser part 34. The straight-tube part 33 has the inlet 31 of the cooling hole 30 and extends along a central axis P from the inlet 31 to a connection portion 35 connected with the diffuser part 34. The extending direction of the central axis P is also the extending direction of the entire cooling hole 30.

An inner peripheral surface 36 of the straight-tube part 33 defines a channel cross section (cross section) 33A. The shape of the channel cross section 33A is constant over the extending direction of the straight-tube part 33. As shown in FIG. 3, the channel cross section 33A has a shape of, for example, a circle around the central axis P as the center. However, the channel cross section 33A of the straight-tube part 33 may be an ellipse, a triangle, a rectangle, or the like.

Like the straight-tube part 33, the diffuser part 34 also extends along the central axis P. The diffuser part 34 communicates (connects) with the straight-tube part 33 and has the outlet 32 of the cooling hole 30. That is, the diffuser part 34 extends along the central axis P from the connection portion 35 with the straight-tube part 33 to the outlet 32 of the cooling hole 30.

As shown in FIG. 3, the diffuser part 34 includes a flat surface 37 and a curved surface 38, which are formed as an inner peripheral surface of the diffuser part 34. The flat surface 37 is positioned forward of the central axis P of the straight-tube part 33 and extends along the central axis P of the straight-tube part 33 to the outer surface 22 of the wall part 20.

On the projection plane, the flat surface 37 of the diffuser part 34 is located forward of the central axis P of the straight-tube part 33 by a distance same as a distance from the central axis P to a forefront portion 36a of the inner peripheral surface 36 of the straight-tube part 33.

For example, when the inner peripheral surface 36 of the straight-tube part 33 is curved forward, the flat surface 37 coincides with the tangent plane of the curved inner peripheral surface 36. In this case, the flat surface 37 has a portion connected to the inner peripheral surface 36 without having a step with the inner peripheral surface 36.

The curved surface 38 of the diffuser part 34 is positioned rearward of the flat surface 37. The curved surface 38 extends from the connection portion 35 to the outer surface 22 of the wall part 20 (the outlet 32 of the cooling hole 30) while curving rearward. As shown in FIG. 3, the curved surface 38, together with the flat surface 37, forms a channel section (a channel cross section 34A of the diffuser part 34) having a semicircular or semi-elliptical shape. The curved surface 38 and the flat surface 37 are connected to each other via fillets 39. The fillet 39 is a minute curved surface for smoothly connecting between the curved surface 38 and the flat surface 37.

The diffuser part 34 includes a first section 40 and a second section 41. The second section 41 extends from the first section 40 toward the outlet 32 of the cooling hole 30. As illustrated by the channel cross section 40B, the area of the channel cross section 40A (see FIG. 3) in the first section 40 increases as it approaches the outlet 32 of the cooling hole 30. In other words, the first section 40 of the diffuser part 34 is flared toward the outlet 32 of the cooling hole 30.

In the second section 41, the area of the channel cross section 41A is constant. In other words, the second section 41 of the diffuser part 34 extends toward the outlet 32 of the cooling hole 30 while having the same channel cross section as the largest channel cross section in the first section 40.

The area of the channel cross section 41A in the second section 41 may increase as the channel cross section 41A approaches the outlet 32 of the cooling hole 30 at an increase rate smaller than that in the first section 40. In other words, the second section 41 may expand (enlarge) more gradually than the first section 40 toward the outlet 32 of the cooling hole 30.

Here, for convenience of explanation, the curved surface 38 in the first section 40 is referred to as the first curved surface 38a, and the curved surface 38 in the second section 41 is referred to as the second curved surface 38b. That is, the inner peripheral surface in the first section 40 is composed of the first curved surface 38a and the flat surface 37, and the inner peripheral surface in the second section 41 is composed of the second curved surface 38b and the flat surface 37.

As shown in FIG. 2, the distance between the flat surface and the central axis P of the straight-tube part 33 is substantially constant. On the other hand, the distance between the first curved surface 38a and the central axis P increases as the first curved surface 38a approaches the outlet 32 of the cooling hole 30. That is, the channel cross section 40A in the first section 40 expands rearward as the channel cross section 40A approaches the outlet 32 of the cooling hole 30. The distance between the second curved surface 38b and the central axis P is constant or increases at an increase rate smaller than that in the first section 40 as it approaches the outlet 32 of the cooling hole 30.

As described above, the flat surface 37 and the curved surface 38 (i.e., the first curved surface 38a and the second curved surface 38b) form a channel cross section 34A having a semicircular shape. FIG. 3 shows channel cross sections 40A, 40B, and 41A as one example. The channel cross section 40A is a cross section of the first section 40 at a position closest to the straight-tube part 33 in the first section 40, and is also a channel cross section of the connection portion 35. The channel cross section 41A is a cross section of the second section 41. The channel cross section 40B indicated by the dotted line is a cross section of the first section 40 at any position between the connection portion 35 and the second section 41.

On the projection plane shown in FIG. 3, the entire straight-tube part 33 is located inside the diffuser part 34. That is, the channel cross section 34A of the diffuser part 34 is larger than the channel cross section 33A of the straight-tube part 33. Therefore, the inner peripheral surface 36 of the straight-tube part 33 and the inner peripheral surface (i.e., flat surface 37 and curved surface 38) of the diffuser part 34 form a stepped surface 35a at the connection portion 35 between the straight-tube part 33 and the diffuser part 34. That is, the inner peripheral surface (at least curved surface 38) of the diffuser part 34 is connected to the inner peripheral surface 36 of the straight-tube part 33 via a stepped surface 35a (see FIG. 1).

The stepped surface 35a extends in a direction crossing the extending direction of the cooling hole 30. That is, the stepped surface 35a may extend from an edge of the straight-tube part 33 in a direction orthogonal to the extending direction of the cooling hole 30, or may extend in a direction inclined with respect to the extending direction of the cooling hole 30.

For convenience of explanation, the direction along the flat surface 37 on the projection plane shown in FIG. 3 is referred to as the width direction WD. A direction orthogonal to a direction along the flat surface 37 on the projection plane is defined as a depth direction (height direction) DD. In this embodiment, the length (width) of the diffuser part 34 in the width direction WD is equal to or twice greater than the length (depth, height) of the diffuser part 34 in the depth direction DD. For example, the width Lw1 of the channel cross section 40A is set to a value equal to or twice greater than the depth (height) Ld1 of the channel cross section 40A. Similarly, the width Lw2 of the channel cross section 41A is set to a value equal to or twice greater than the depth (height) Ld2 of the channel cross section 40A. The cross-sectional shape of the diffuser part 34 at other locations also has the same dimensional relationship. Accordingly, the channel cross section 34A of the diffuser part 34 has a semicircular shape that is elongated in the direction along the flat surface 37 (i.e., the width direction WD).

Figure 4:
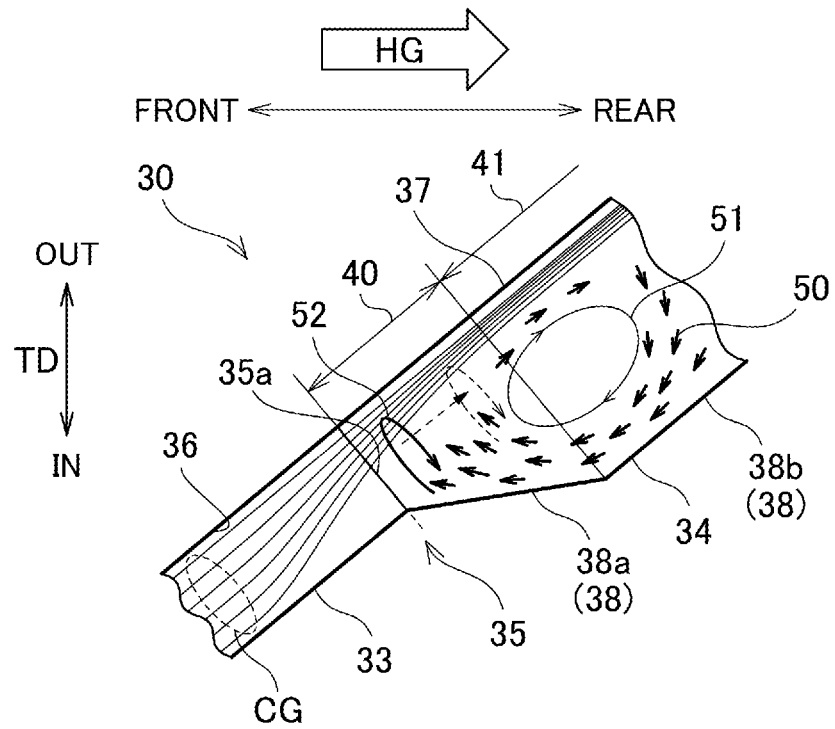
FIG. 4 is a diagram illustrating a flow of the cooling medium through the cooling hole according to the first embodiment.

FIG. 4 is a diagram illustrating a flow of the cooling medium CG in the cooling hole 30 according to the first embodiment. In the figure, the main stream of the cooling medium CG is shown by a solid line. As shown in this figure, the main stream of the cooling medium CG flows from the straight-tube part 33 to the diffuser part 34. The flow path of the cooling hole 30 extending from the inlet 31 starts to expand rearward at the connection portion 35. With this expansion of the flow path, the main stream of the cooling medium CG is separated from the curved surface 38 and flows toward the outlet 32 of the cooling hole 30 while maintaining the state thereof.

Because of the separation described above, a secondary flow 50 of the cooling medium CG is generated. The secondary flow 50 flows in the same direction as the main stream of the cooling medium CG in a space near the main stream of the cooling medium CG, but flows in the opposite direction to the main stream of the cooling medium CG in a space far from the main stream of the cooling medium CG. That is, the secondary flow 50 forms a vortex (secondary vortex) 51 shown in FIG. 4.

The secondary flow 50 in the second section 41 generally flows in a direction from the flat surface 37 toward the second curved surface 38b. On the other hand, as described above, the second curved surface 38b extends in the extending direction of the cooling hole 30 with an inclination angle smaller than that of the first curved surface 38a. Consequently, as compared with a case where the first curved surface 38a would extend until the outlet 32 of the cooling hole 30, more secondary flow 50 can be deflected to the straight-tube part 33.

The secondary flow 50 toward the straight-tube part 33 flows along the first curved surface 38a, narrows the main stream of the cooling medium CG narrows in the depth direction DD and spreads it in the width direction WD. That is, the film cooling air spreads in the width direction to enhance the film cooling efficiency. In addition, since the cooling medium CG is not excessively accelerated or decelerated, the speed difference between the accelerated cooling medium CG and the main stream of the heat medium is reduced. Consequently, it is possible to suppress an aerodynamic loss (pressure loss) caused by mixing of the cooling medium CG and the heating medium HG when the cooling medium CG flows out of the outlet 32 of the cooling hole 30.

Because of the expansion of the channel cross section in the diffuser part 34 and the separation of the main stream of the cooling medium CG, another vortex (secondary vortex) 52 is generated in the diffuser part 34 in addition to the vortex 51 as described above. The vortex 52 is generated in the vicinity of the connection portion 35 and on both sides of the straight-tube part 33 in the width direction WD. The vortex 52 rotates about an axis parallel to the extending direction of the cooling hole 30 and causes aerodynamic loss. However, as described above, the secondary flow 50, which forms the vortex 51, flows from the curved surface 38 of the diffuser part 34 toward the flat surface 37 of the diffuser part 34 in the vicinity of the connection portion 35.

The secondary flow 50 attenuates the vortex 52 traveling to the outlet 32 of the cooling hole 30.

The main stream of the cooling medium CG spreads (expands) in the width direction WD of the cooling hole 30 in accordance with the compression thereof by the secondary flow 50. In addition, the vortex 52 causing the aerodynamic loss is attenuated as it travels to the outlet 32. Therefore, according to the film cooling structure of the present embodiment, the film cooling can be widely performed with suppressing the aerodynamic loss. That is, the cooling efficiency with the cooling medium CG can be improved.

Second Embodiment

Figure 5:
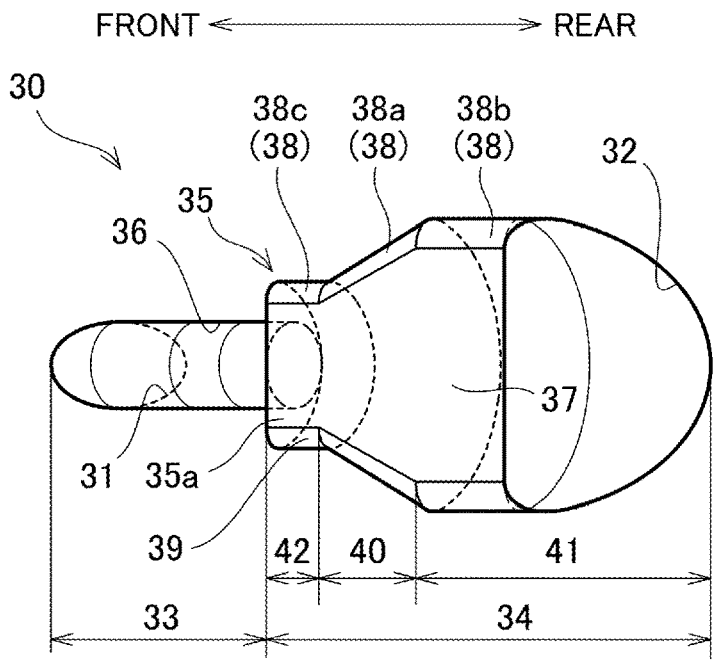
FIG. 5 is a top view illustrating a cooling hole according to a second embodiment of the present disclosure.
Figure 6:
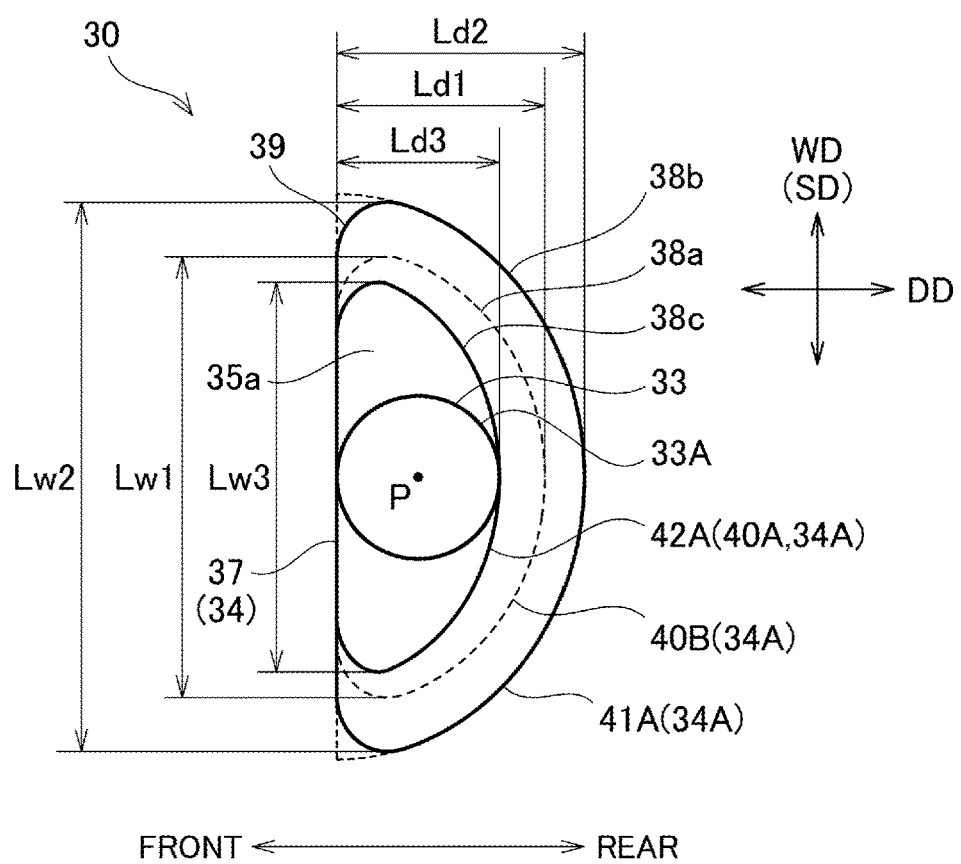
FIG. 6 is a diagram (projection view) illustrating an example of a cooling hole according to a second embodiment on a projection plane.
Figure 7:
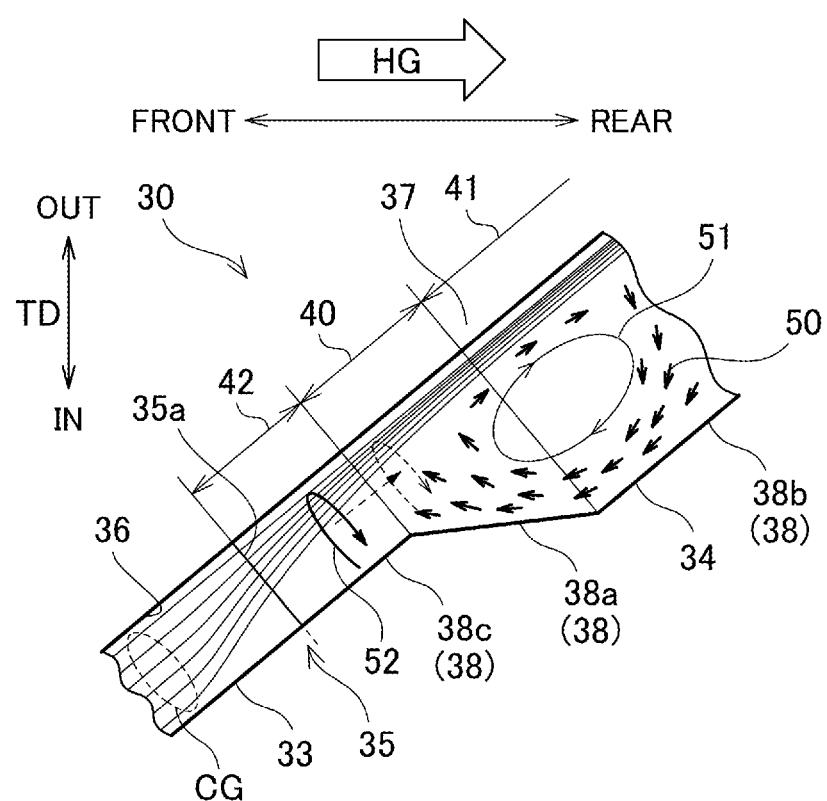
FIG. 7 is a diagram illustrating a flow of a cooling medium through a cooling hole according to the second embodiment.

Next, a second embodiment of the present disclosure will be described. FIG. 5 is a top view illustrating the cooling hole according to the second embodiment. FIG. 6 is a diagram (projection view) showing an example of the cooling hole 30 according to the second embodiment on a projection plane. FIG. 7 is a diagram illustrating a flow of the cooling medium CG in the cooling hole 30 according to the second embodiment. As shown in FIG. 5, the diffuser part 34 according to the second embodiment includes a third section 42 positioned between the straight-tube part 33 and the first section 40 of the diffuser part 34. The inner peripheral surface of the third section 42 includes a third curved surface 38c being a part of the curved surface 38 and the flat surface 37. Other configurations of the second embodiment are the same as those of the first embodiment.

The third section 42 extends between the straight-tube part 33 and the first section 40 with a channel cross section 42A having a constant shape. The channel cross section 42A has the same shape as the channel cross section 40A at a position closest to the straight-tube part 33 in the first section 40. With the formation of the third section 42, the stepped surface 35a is formed between the straight-tube part 33 and the third section 42.

As described above, in the diffuser part 34, a vortex 52, which may cause aerodynamic loss, is generated in the vicinity of the connection portion 35. In the present embodiment, the vortex 52 is generated mainly in the third section 42 and travels toward the outlet 32 of the cooling hole 30. On the other hand, the secondary flow 50, which forms the vortex 51, flows toward the third section 42 in the vicinity of the first curved surface 38a in the first section 40, and then flows in a direction from the first curved surface 38a toward the flat surface 37. The secondary flow 50 flowing toward the flat surface 37 merges (collides) with the vortex 52 to prevent the travel of the vortex 52 and attenuate it.

The formation of the third section 42 expands a region in which the secondary flow 50 attenuates the vortex 52. The secondary flow 50 also expands a region where the main stream of the cooling medium CG is compressed. Accordingly, the acceleration of the main stream of the cooling medium CG can be promoted, thereby the aerodynamic loss can be further suppressed.

Here, for convenience of explanation, an aspect ratio of the diffuser part 34 is defined. The aspect ratio is a value obtained by dividing the length (width) of the diffuser part 34 in the width direction WD by the length (depth, height) of the diffuser part 34 in the depth direction DD.

As shown in FIG. 6, the aspect ratio (Lw3/Ld3) of the third section 42 may be larger than the respective aspect ratios (Lw1/Ld1 and Lw2/Ld2) of the first section 40 and the second section 41. That is, the third section 42 may have a flatter shape in the width direction WD than those of the first section 40 and the second section 41.

Third Embodiment

Figure 8A:
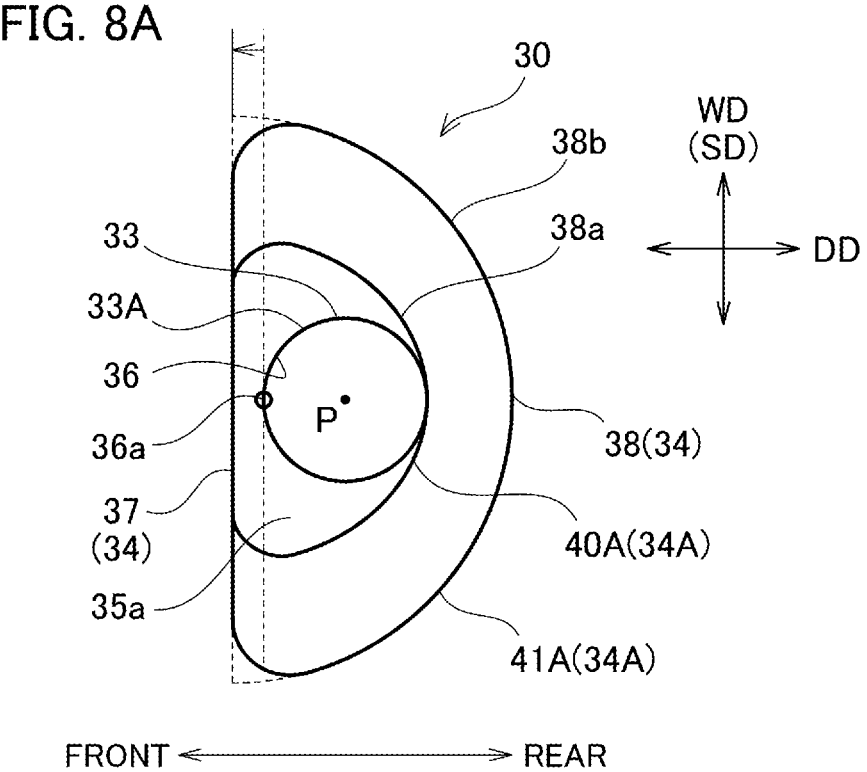
FIGS. 8A and 8B are diagrams (projection views) illustrating examples of a cooling hole according to a third embodiment on a projection plane.
Figure 8B:
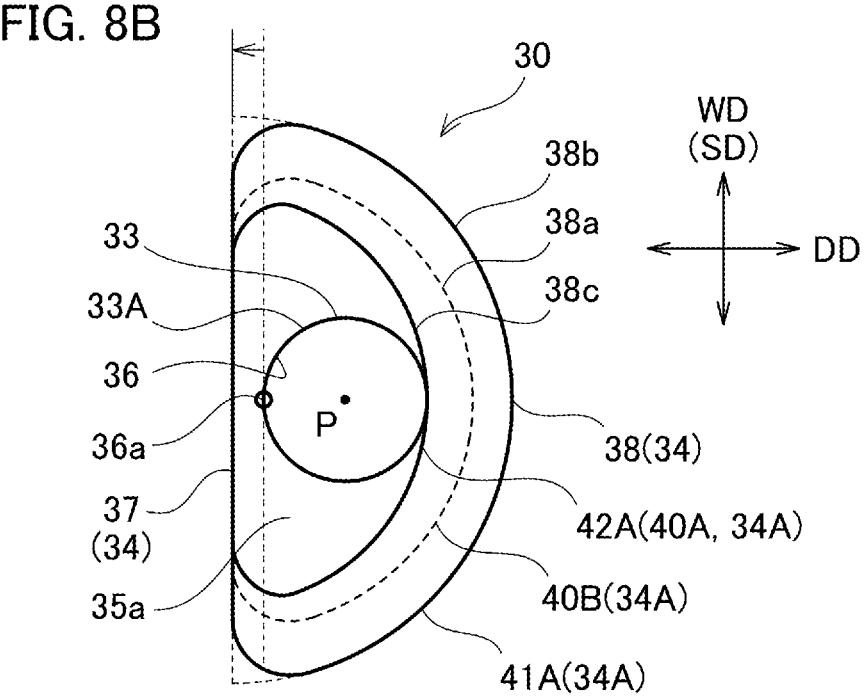
Figure 9A:
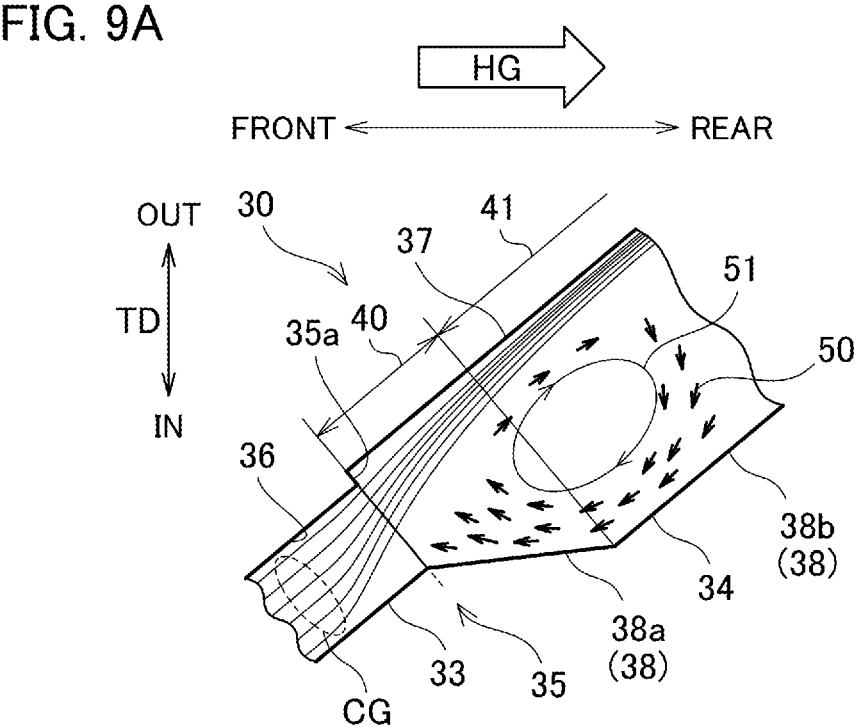
FIGS. 9A and 9B are cross-sectional views each illustrating the film cooling structure according to the third embodiment.
Figure 9B:
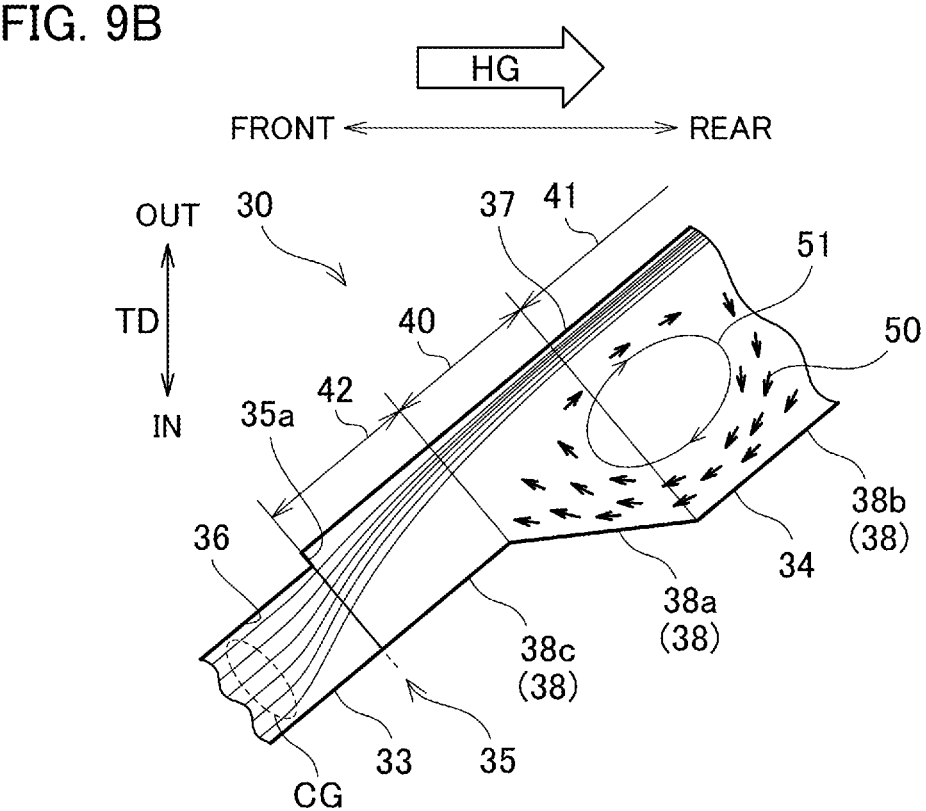

Next, a third embodiment of the present disclosure will be described. FIGS. 8A and 8B are diagrams (projection views) illustrating examples of the cooling hole 30 according to the third embodiment on the projection plane. FIG. 8A is a diagram illustrating a first example thereof, and FIG. 8B is a diagram illustrating a second example thereof. FIGS. 9A and 9B are sectional views each illustrating a film cooling structure 10 according to the third embodiment. FIG. 9A is a cross-sectional view illustrating a first example thereof, and FIG. 9B is a sectional view illustrating a second example thereof. FIGS. 9A and 9B illustrate the flow of the cooling medium CG in the cooling hole 30.

The diffuser part 34 shown in FIG. 8A is a modification of the first embodiment and includes the first section 40 and the second section 41. The diffuser part 34 shown in FIG. 8B is a modification of the second embodiment and includes the first section 40, the second section 41 and the third section 42.

The flat surface 37 of the diffuser part 34 according to the third embodiment is offset forward of the inner peripheral surface 36 of the straight-tube part 33 on the projection plane of the cooling hole 30. Therefore, a stepped surface 35a is interposed between the flat surface 37 and the inner peripheral surface 36. The other configuration of the third embodiment is the same as that of the first and second embodiments.

Also in the third embodiment, the secondary flow 50, which forms the vortex 51, flows along the first curved surface 38a toward the straight-tube part 33. The secondary flow 50 compresses the main stream of the cooling medium CG at the connection portion 35 and its periphery. On the other hand, as described above, the flat surface 37 of the third embodiment is offset forward of the straight-tube part 33. Accordingly, the main stream of the cooling medium CG is deflected forward while being compressed by the secondary flow 50. Accordingly, the acceleration of the main stream of the cooling medium CG and the dispersion of the main stream in the width direction WD are promoted.

Fourth Embodiment

Figure 10:
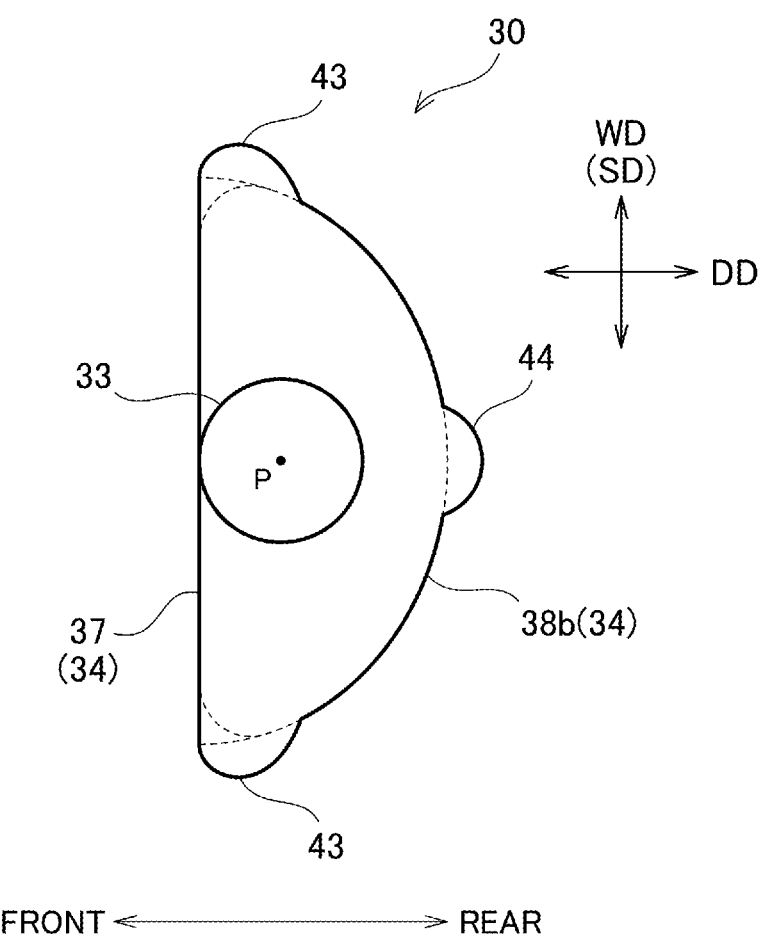
FIG. 10 is a diagram (projection view) showing an example of a cooling hole according to a fourth embodiment on a projection plane.

Next, a fourth embodiment of the present disclosure will be described. FIG. 10 is a diagram (projection view) illustrates an example of the cooling hole 30 according to the fourth embodiment on a projection plane. In the fourth embodiment, at least one of the first recess 43 and the second recess 44 is provided on the second curved surface 38b of the second section 41. Other configurations of the fourth embodiment are the same as those of the first to third embodiments.

For convenience of explanation, FIG. 10 illustrates only the straight-tube part 33 and the second section 41. As shown in this figure, the first recess 43 is located on each of both sides of the straight-tube part 33 in a direction along the flat surface 37 of the diffuser part 34 on the projection plane (i.e., the width direction WD). The first recess 43 is curved in a direction separating from the central axis P. The first recess 43 has a curvature radius sufficiently smaller than that of the second curved surface 38b and extends to the outlet 32 of the cooling hole 30. The flat surface 37 of the diffuser part 34 may be inclined or curved to be widened toward the outlet 32. In other words, the flat surface 37 may be inclined or curved relative to the central axis P such that the closer the flat surface 37 is to the outlet 32, the farther it is from the central axis P. The angle between this inclined surface or curved surface (tangent plane thereof) and the outer surface 22 (outlet 32) increases toward the outlet 32.

The second recess 44 is positioned at the rearmost part of the second curved surface 38b on the projection plane. Same as the first recess 43, the second recess 44 is also curved in a direction separating from the central axis P (i.e., rearward) with a curvature radius sufficiently smaller than that of the second curved surface 38b and extends to the outlet 32 of the cooling hole 30. Here, both the first recess 43 and the second recess 44 may extend from a predetermined position in the second curved surface 38b to the outlet 32, or may extend from the first curved surface 38a of the first section 40 to the outlet 32. A part of the second curved surface 38b may have a tapered surface tapered rearward and in the width direction WD.

According to an analysis of the present disclosure, the cooling efficiency by the cooling medium CG can be improved by forming at least one of the first recess 43 and the second recess 44 on the second curved surface 38b.

It should be noted that the first to third embodiments can apply the aforementioned inclination of the flat surface 37 with respect to the central axis P or curvature of the flat surface 37 with respect to the central axis P (i.e., replacement of the curved surface).

Fifth Embodiment

Next, a fifth embodiment of the present disclosure will be described. The fifth embodiment of the present disclosure is a turbine blade for a gas turbine engine, which applies a film cooling structure 10 according to any one of the first to fourth embodiments. A stator vane 60 as the turbine blade together with the rotor blade (not shown) constitutes a turbine (not shown) of a gas turbine engine (not shown). The film cooling structure 10 may be applied to the rotor blade as the turbine blade, as similar to the stator vane 60.

Figure 11:
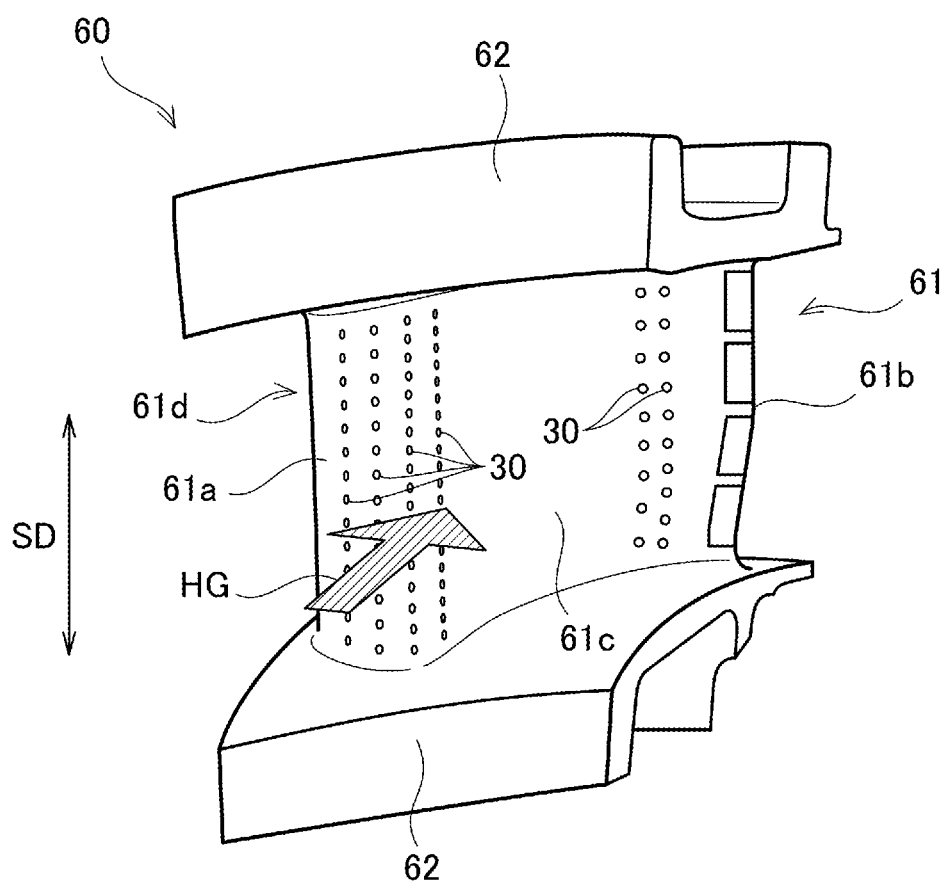
FIG. 11 is a perspective view illustrating a schematic configuration of a turbine blade (stator vane) according to the fourth embodiment.

FIG. 11 is a perspective view illustrating a schematic configuration of the stator vane 60. As shown in this figure, the stator vane 60 includes an airfoil 61, bands 62, and cooling holes 30. The airfoil 61 is provided on the downstream side of a combustor (not shown) which discharges the combustion gas as the aforementioned heating medium HG. That is, the airfoil 61 is located in a flow path of the combustion gas.

The airfoil 61 has a leading edge 61a, a trailing edge 61b, a pressure surface (pressure side) 61c, and a suction surface (suction side) 61d. Combustion gas as the heating medium HG flows in the direction from the leading edge 61a to the trailing edge 61b along the pressure surface 61c and the suction surface 61d.

The airfoil 61 is provided with an internal space (cavity or cooling channel (not shown)) into which cooling air as a cooling medium CG is introduced. The cooling air is extracted from a compressor (not shown), for example. The bands 62 are provided to sandwich the airfoil 61 in a span direction SD of the airfoil 61. The bands 62 function as a part of a wall of the flow path of the combustion gas (i.e., endwalls, platforms or shrouds). These bands 62 are integrated with the tip and the hub of the airfoil 61.

In this embodiment, the film cooling structure 10 is applied to at least one of the pressure surface 61c and the suction surface 61d of the airfoil 61. That is, at least one of the pressure surface 61c and the suction surface 61d of the airfoil 61 functions as the wall part 20 of the film cooling structure 10, and the cooling holes 30 are formed therein.

Hereinafter, for convenience of explanation, an example in which the film cooling structure 10 is provided on the pressure surface 61c will be described.

The cooling hole 30 penetrates through the pressure surface 61c and is inclined such that the outlet 32 is positioned closer to the trailing edge 61b than the inlet 31. The flat surface 37 of the diffuser part 34 extends in the extending direction of the cooling hole 30 and in the span direction SD of the airfoil 61.

In the pressure surface 61c, the main stream of the combustion gas flows in a direction from the leading edge 61a toward the trailing edge 61b. On the other hand, the cooling air, which has been introduced into the airfoil 61, flows into the inlet 31 of the cooling hole 30 and flows out of the outlet 32. The cooling air, which has flown out of the outlet 32, flows downstream while merging with the main stream of the combustion gas. While exiting the outlet 32, the cooling air is expanded in the span direction SD. Therefore, the cooling area on the pressure surface 61c can be extended in the span direction SD.

In addition, the cooling air is accelerated until it flows out of the outlet 32. Thus, the speed difference between the main stream of the cooling air and the main stream of the combustion gas is reduced, thereby aerodynamic loss can be suppressed. That is, it is possible to provide a turbine blade capable of performing film cooling of a wide area while suppressing aerodynamic loss.

It should be noted that the present disclosure is not limited to the embodiments described above, but is indicated by the description of the claims and further includes all modifications within the meaning and scope of the description of the claims.

What is claimed is:

1. A film cooling structure comprising:
   a wall part having an outer surface and an inner surface and extending forward and rearward;
   a cooling hole penetrating through the wall part, including an inlet opening to the inner surface and an outlet opening to the outer surface, and being inclined such that the outlet is positioned rearward of the inlet; wherein
   the cooling hole includes a straight-tube part having the inlet, and a diffuser part connecting with the straight-tube part and having the outlet,
   the diffuser part includes:
      a flat surface;
      a curved surface curved rearward and forming a channel cross section together with the flat surface, the channel cross section having a semicircular or semi-elliptical shape larger than that of the straight-tube part;
      a first section in which an area of the channel cross section increases as the channel cross section approaches the outlet of the cooling hole; and
      a second section in which an area of the channel cross section increases at an increase rate or is constant as the channel cross section approaches the outlet of the cooling hole, the second section extending from the first section toward the outlet of the cooling hole, and the increase rate being smaller than that in the first section,
   the straight-tube part is positioned inside the diffuser part on a projection plane of the cooling hole orthogonal to an extending direction of the cooling hole, and
   the diffuser part has a length along the flat surface on the projection plane equal to or twice greater than a length of the diffuser part along a direction orthogonal to the flat surface on the projection plane.

2. The film cooling structure according to claim 1, wherein
the diffuser part includes a third section positioned between the straight-tube part and the first section, and
the third section extends between the straight-tube part and the first section with a cross section of the same shape as the cross section of the first section at a position closest to the straight-tube part.

3. The film cooling structure according to claim 1, wherein
the flat surface of the diffuser part is offset forward of an inner peripheral surface of the straight-tube part on the projection plane.

4. The film cooling structure according to claim 2, wherein
the flat surface of the diffuser part is offset forward of an inner peripheral surface of the straight-tube part on the projection plane.

5. The film cooling structure according to claim 1, wherein,
on the projection plane, the flat surface of the diffuser part is located forward of a central axis of the straight-tube part by a distance same as a distance from the central axis to a forefront portion of an inner peripheral surface of the straight-tube part, the forefront portion being located forefront.

6. The film cooling structure according to claim 2, wherein,
on the projection plane, the flat surface of the diffuser part is located forward of a central axis of the straight-tube part by a distance same as a distance from the central axis to a forefront portion of an inner peripheral surface of the straight-tube part, the forefront portion being located forefront.

7. The film cooling structure according to claim 1, wherein
the curved surface of the diffuser part includes a first recess extending to the outlet of the cooling hole, and
the first recess is located on each of both sides of the straight-tube part in a direction along the flat surface of the diffuser part on the projection plane.

8. The film cooling structure according to claim 2, wherein
the curved surface of the diffuser part includes a first recess extending to the outlet of the cooling hole, and
the first recess is located on each of both sides of the straight-tube part in a direction along the flat surface of the diffuser part on the projection plane.

9. The film cooling structure according to claim 3, wherein
the curved surface of the diffuser part includes a first recess extending to the outlet of the cooling hole, and
the first recess is located on each of both sides of the straight-tube part in a direction along the flat surface of the diffuser part on the projection plane.

10. The film cooling structure according to claim 4, wherein
the curved surface of the diffuser part includes a first recess extending to the outlet of the cooling hole, and
the first recess is located on each of both sides of the straight-tube part in a direction along the flat surface of the diffuser part on the projection plane.

11. The film cooling structure according to claim 5, wherein
the curved surface of the diffuser part includes a first recess extending to the outlet of the cooling hole, and
the first recess is located on each of both sides of the straight-tube part in a direction along the flat surface of the diffuser part on the projection plane.

12. The film cooling structure according to claim 6, wherein
the curved surface of the diffuser part includes a first recess extending to the outlet of the cooling hole, and
the first recess is located on each of both sides of the straight-tube part in a direction along the flat surface of the diffuser part on the projection plane.

13. The film cooling structure according to claim 1, wherein
the curved surface of the diffuser part includes a second recess extending to the outlet of the cooling hole, and
the second recess is located rearmost on the projection plane.

14. The film cooling structure according to claim 2, wherein
the curved surface of the diffuser part includes a second recess extending to the outlet of the cooling hole, and
the second recess is located rearmost on the projection plane.

15. The film cooling structure according to claim 3, wherein
the curved surface of the diffuser part includes a second recess extending to the outlet of the cooling hole, and
the second recess is located rearmost on the projection plane.

16. The film cooling structure according to claim 4, wherein
the curved surface of the diffuser part includes a second recess extending to the outlet of the cooling hole, and
the second recess is located rearmost on the projection plane.

17. The film cooling structure according to claim 5, wherein
the curved surface of the diffuser part includes a second recess extending to the outlet of the cooling hole, and
the second recess is located rearmost on the projection plane.

18. The film cooling structure according to claim 6, wherein
the curved surface of the diffuser part includes a second recess extending to the outlet of the cooling hole, and
the second recess is located rearmost on the projection plane.

19. The film cooling structure according to claim 1, wherein
the flat surface of the diffuser part is inclined or curved to be widened toward the outlet.

20. A turbine blade for a gas turbine engine comprising a film cooling structure according to claim 1.

* * * * *